Sept. 30, 1941.  H. F. YULA  2,257,442
THERMOSTATICALLY CONTROLLED MIXING DEVICE
Filed May 21, 1940  2 Sheets-Sheet 1

INVENTOR.
HENRY F. YULA
BY
Clark & Ott
ATTORNEYS

Sept. 30, 1941. H. F. YULA 2,257,442
THERMOSTATICALLY CONTROLLED MIXING DEVICE
Filed May 21, 1940 2 Sheets-Sheet 2

INVENTOR.
HENRY F. YULA
BY Clark + Ott
ATTORNEYS

Patented Sept. 30, 1941

2,257,442

UNITED STATES PATENT OFFICE 2,257,442

THERMOSTATICALLY CONTROLLED MIXING DEVICE

Henry F. Yula, New York, N. Y.

Application May 21, 1940, Serial No. 336,333

5 Claims. (Cl. 236—12)

This invention relates to blenders or mixing valves for controlling the temperature of the water supply to bathrooms, kitchens or the like, and has particular reference to an improved mixing device having a thermostatically controlled valve means for regulating the admission of hot and cold water through hot and cold water ports disposed intermediate a mixing chamber and hot and cold water chambers respectively, and heater tubes connecting the hot and cold water chambers for diverting the required amount of cold water and conducting the same through a heater for delivering hot water to the hot water chamber.

The invention is directed to a device of the indicated character which includes a thermostatically controlled valve element mounted to move within a mixing chamber and between opposed valve ports communicating respectively with hot and cold water chambers connected by tubes extending into the steam or hot water chamber of a heater so as to control the temperature of the water in the mixing chamber by the movement of the valve element towards and away from the valve ports for the admission through said ports of the required flow of hot and cold water.

The invention further resides in a mixing device which includes a valve casing having a wall adapted for attachment to a heater to form a portion of the wall of the heating chamber, and which casing is provided with interior partitions subdividing the casing into hot and cold water chambers and a mixing chamber disposed intermediate said hot and cold water chambers having opposed valve ports communicating respectively with said hot and cold water chambers, a mixed water chamber communicating with said mixing chamber, a thermostatic element mounted within said mixed water chamber and controlling a reciprocatory valve element mounted to move within said mixing chamber between said opposed valve ports to progressively open the cold water port and close the hot water port when moved in one direction and to progressively open the hot water port and close the cold water port when moved in the opposite direction, and heater tubes affixed to the inner face of said wall and communicating with the hot and cold water chambers for diverting cold water from the cold water chamber and conducting the same through said heater for delivering hot water to the hot water chamber.

With the foregoing and other objects in view, reference is now made to the following specification and accompanying drawings in which there is illustrated the preferred form of the invention.

Figure 1:
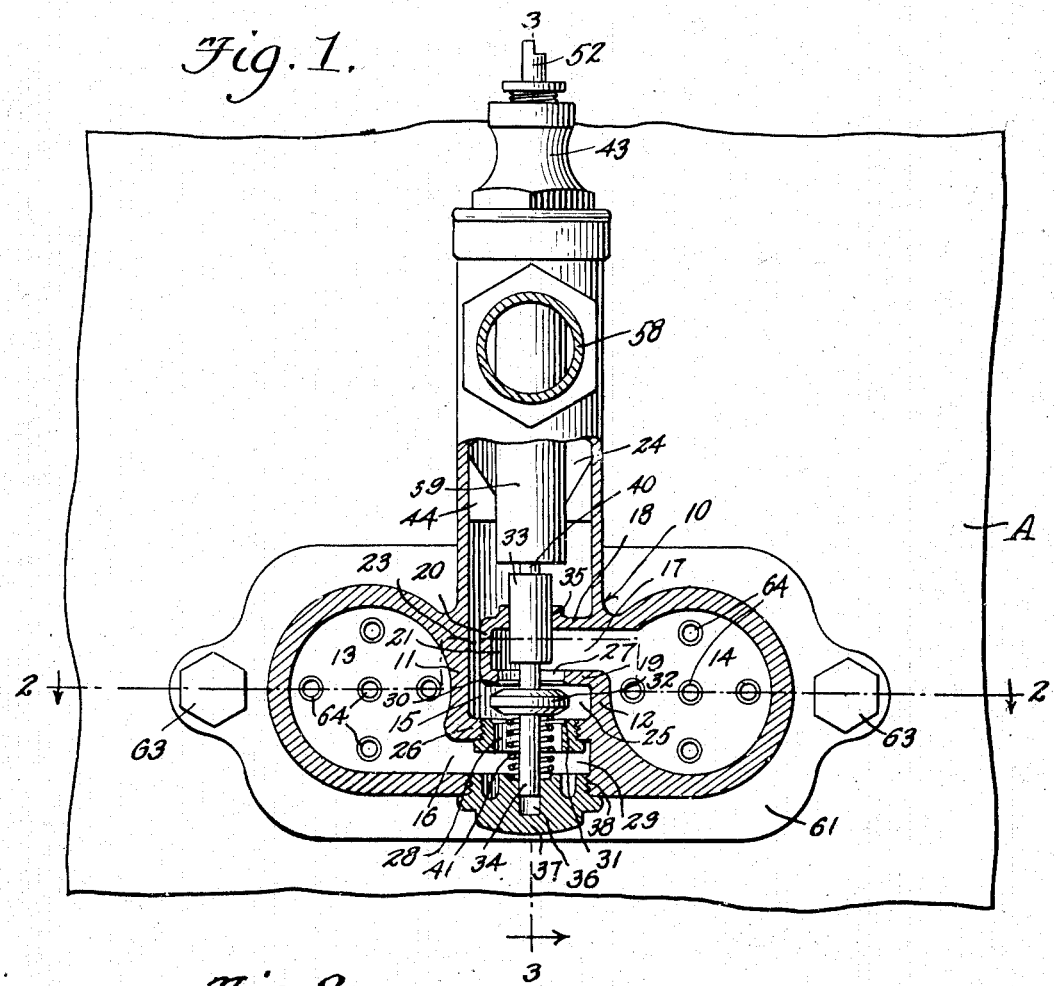
Fig. 1 is a front view of a thermostatically controlled mixing device with parts broken away and shown in section and illustrating the same in applied position to a furnace.
Figure 2:
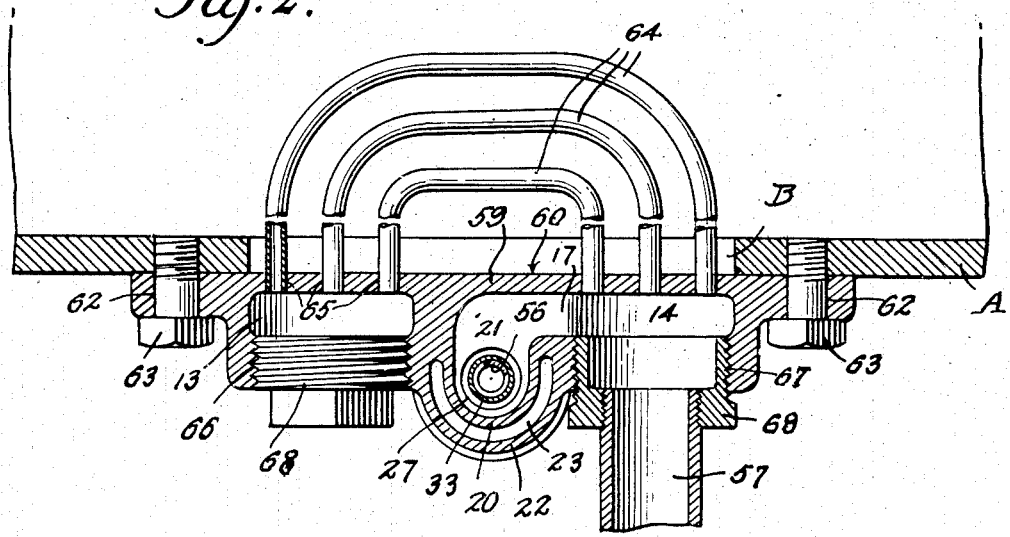
Fig. 2 is a horizontal sectional view taken approximately on the line 2—2 of Fig. 1.
Figure 3:
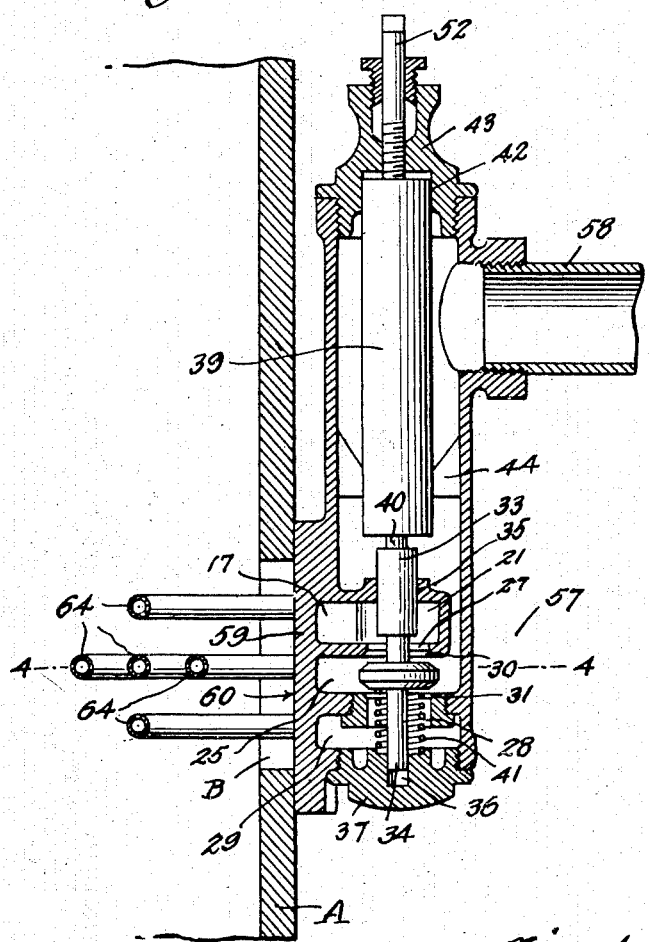
Fig. 3 is a vertical sectional view therethrough taken approximately on the line 3—3 of Fig. 1.
Figure 5:
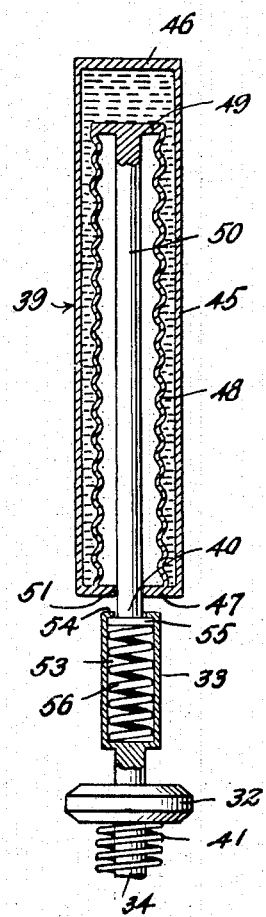
Fig. 5 is an enlarged vertical sectional view through the thermostatically controlled element and through the relief means for the valve element.
Figure 4:
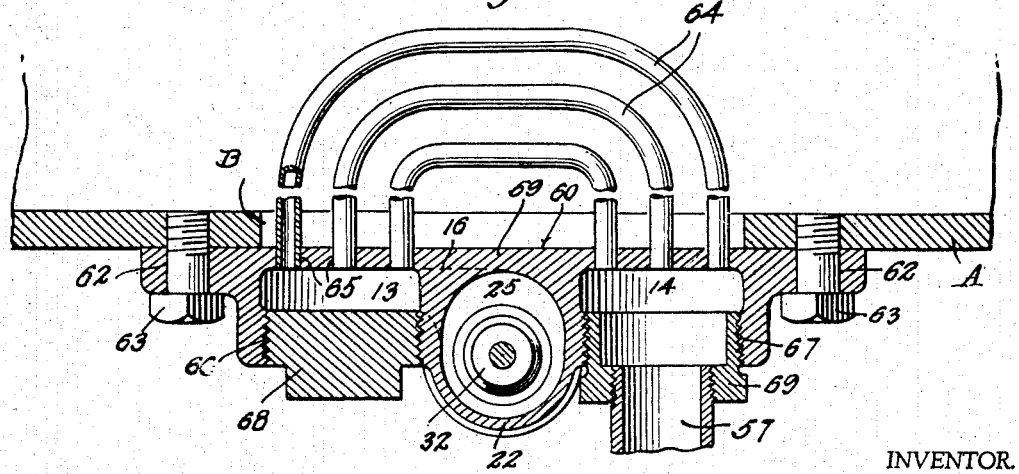
Fig. 4 is a horizontal sectional view taken approximately on the line 4—4 of Fig. 3.

Referring to the drawings by characters of reference, the mixing device includes a casing indicated generally by the reference character 10 and which, as illustrated, is of inverted T-shaped formation in front elevation, the enlarged end thereof being provided with oppositely directed interior partitions 11 and 12 extending inwardly from the upper and lower walls thereof respectively, and which subdivide the said end of the casing into laterally spaced substantially circular hot and cold water chambers 13 and 14, and an intermediate water passageway 15 between the said partitions and provide at the innermost ends of the partitions, outlet openings 16 and 17 for the said chambers respectively.

The casing is also provided with transverse partitions 18 and 19 located within the passageway 15 above and below the outlet opening 17 and which partitions are connected at their forward arcuate edges by a vertical web 20 of arcuate shape in cross sectional configuration, to thus provide within the passageway 15 of a cold water duct 21 communicating with the opening 17 and defining with the forward wall 22 of the casing an arcuate duct 23. The duct 23 communicates at its outlet end with a mixed water chamber 24 within the upper portion of the casing and with a mixing chamber 25 disposed between the partition 19 and a transverse partition 26 extending from the lowermost end of the partition 11 to the mid portion of the partition 12. The partitions 19 and 26 have aligned ports 27 and 28 establishing communication between the mixing chamber 25 and the cold water duct 21 and a hot water duct 29 which communicates with the hot water chamber 13 and which ports have beveled confronting edges 30 and 31 defining valve seats.

Disposed within the mixing chamber 25 for vertical reciprocatory movement towards and away from the valve seats 30 and 31 is a double faced valve disk 32 having upper and lower valve stem portions 33 and 34 slidably mounted respectively in a guide opening 35 in the partition 18 and in a guide opening 36 in a removable plug 37 which is threadedly engaged in an opening 38 in the lower wall of the casing.

In order to automatically regulate the flow of the hot and cold water through the ports 27 and 28 to effect a predetermined temperature of the water in the mixed water chamber 24, a thermostatic element indicated generally by the reference character 39 is provided which is disposed within the mixed water chamber with its lower terminal 40 adapted to engage the upper end of the upper stem portion 33 against the action of a coiled expansion spring 41 surrounding the lower stem portion 34 and interposed between the lower face of the disk 32 and the inner face of the plug 37.

The thermostatic element 39 is mounted within the mixed water chamber 24 for vertical adjustment with its upper end slidably disposed within a cylindrical bore 42 in a screw cap 43 fitted in the upper open end of the casing and with its lower portion engaged by a plurality of circumferentially spaced radially disposed lugs 44 so as to space the thermostatic element from the wall of the casing and dispose the same in vertical alignment with the valve element.

The thermostatic element 39 includes a tubular shell 45 closed at its opposite end by heads 46 and 47, the head 47 having secured thereto an upwardly extending extensible and contractible flexible bellows 48 closed at its upper end by a head 49 and to which head is secured a depending plunger 50 which protrudes through an opening 51 in the head 47 with its terminal 40 engaging the upper end of the upper stem portion 33 as hereinbefore described. The bellows 48 is centrally disposed within the shell 45 in spaced relation to the wall thereof and which contains in surrounding relation with the bellows 48, a thermal fluid adapted upon increase of temperature of the water in the mixing chamber 24 to effect the contraction of the bellows 48 to thereby move the plunger 50 downwardly and the valve disk 32 away from the cold water port 27 and towards the hot water port 28 thus increasing the flow of the cold water and decreasing the flow of the hot water into the mixing chamber 25 through the ports 27 and 28.

Conversely upon decrease of temperature of the water in the mixing chamber 24, the thermal fluid will contract to permit the expansion of the bellows 48 to thereby raise the plunger 50 and permit the valve spring 41 to move the valve disk 32 towards the cold water port 27 and away from the hot water port 28 thus proportionately increasing the flow into the mixing chamber of the hot water with reference to the cold water. The thermostatic element 39 is adjustable towards and away from the valve element by means of a set screw 52 threadedly engaging the cap 43 and bearing against the head 46 of the thermostatic element to vary the temperature at which the thermostatic element becomes effective to actuate the valve element.

The upper stem portion 33 of the valve element has a bore 53 extending inwardly from the upper end thereof and is provided with an inwardly directed annular shoulder 54. A bearing disk 55 is slidable within the bore 53 and is normally maintained against the shoulder 54 by a relief spring 56 disposed within the bore 53 between the bottom thereof and the disk 55. The normal tension of the spring 56 is in excess of the tension of the valve spring 41 so that the plunger 50 of the thermostatic element engaging the disk 55 of the relief element must move the valve disk 32 to fully closed relation to its seat 31 against the tension of the valve spring 41 before the relief spring 56 will be compressed to function in its capacity as a relief means. This serves to prevent rupture of the thermostatic element in the event that the said element continues to exert a downward pressure on the valve element after the valve disk is seated on the valve seat 31.

The casing is provided with a cold water inlet 57 communicating with the cold water chamber 14 and a mixed water outlet 58 communicating with the mixed water chamber 24 both of which open through the casing in the forward face thereof. The opposite side of the casing at the enlarged end thereof is provided with a rear wall 59 having a plane outer face 60 and a marginal rim 61 provided with openings 62 therethrough adapted to receive bolts 63 for securing the mixing device to the wall of a furnace or heater A in covering relation to an opening B in the heating chamber thereof. A plurality of continuous tubes 64 have their opposite ends secured in openings 65 in the rear wall 59 of the casing in communication at their opposite ends with the hot and cold water chambers respectively, and with their intermediate portions disposed within the heater chamber of the furnace for diverting the required amount of cold water from the cold water chamber 14 and conducting the same through the heater for delivering hot water to the hot water chamber 13.

In practice, the enlarged end of the casing is provided with threaded openings 66 and 67 which extend from the hot and cold water chambers 13 and 14 respectively and open through the front wall. The hot water chamber is closed by a threaded plug 68 and the opening 67 has threaded therein a nipple 69 through which the inlet pipe 57 extends.

In operation, the cold water is admitted to the mixing device through the inlet 57 and enters the cold water chamber 14 where it is divided, part of it flowing through the tubes 64 and becoming heated by the heat in the furnace or heater A, then enters the hot water chamber 13 from whence it flows through the hot water port 28 into the mixing chamber 15. The remainder of the cold water flows through the outlet 17, duct 21 and through the cold water port 27 where it is mixed with the hot water in the mixing chamber 15 and the mixed water passes through the duct 23 and into the mixed water chamber 24 where it comes into contact with the casing 45 of the thermostatic element 39. The thermal fluid within the thermostatic element 39 becoming heated by the mixed water in the chamber 24, will expand and effect a contraction of the bellows 48 to move the plunger 50 downwardly and thereby move the valve 32 to a position to admit through the hot and cold water ports 26 and 27 the proper amount of hot and cold water so that the temperature in the mixed water chamber 24 will be in accordance with the longitudinal setting of the thermostatic element 39 by the set screw 52. Any change in temperature in the hot or cold water entering the mixing chamber 15 through the hot and cold water ports 26 and 27 by which the temperature of the mixed water in the chamber 24 is affected, will affect the thermal fluid to move the valve 32 towards the hot water port if the temperature of the water in the mixing chamber 24 is excessive or above the predetermined setting of the set screw 52, or permit the spring 41 to move the valve 32 towards the cold water port if the temperature of the water in the mixed water chamber 24 is below the predetermined setting of the set screw 52, or permit the spring 41 to move the valve 32 towards the cold water port if the temperature of the water in the mixed water chamber 24 is below the predetermined setting of the set screw 52. The temperature of the mixed water in the mixed water chamber 24 is thus maintained substantially at a constant temperature in accordance with the predetermined setting of the set screw 52 whereby the mixed water discharged through the outlet 58 may be maintained substantially at a constant temperature.

What is claimed is:

1. In a thermostatically controlled water heater, a valve casing having a wall adapted for attachment to a heater to form a portion of the wall of the heating chamber thereof, said casing having interior partitions subdividing the casing into hot and cold water chambers and a mixing chamber disposed intermediate said hot and cold water chambers, said interior partitions having opposed valve ports respectively opening into said mixing chamber and communicating with the hot and cold water chambers respectively, said casing also including a mixed water chamber communicating with said mixing chamber, a reciprocatory valve element including a valve disc located within said mixing chamber to move therein between said opposed valve ports and having a valve stem guidedly mounted in the adjacent wall of the mixed water chamber and protruding into said chamber, a thermostatic element mounted within said mixed water chamber and controlling said valve element to progressively open the port to the hot water chamber and to close the port to the cold water chamber when the valve element is moved in one direction and to progressively open the port to the cold water chamber and close the port to the hot water chamber when the valve element is moved in the opposite direction, heater tubes affixed to the inner face of said wall and communicating with the hot and cold water chambers for diverting cold water from the cold water chamber and conducting the same through said heater for delivering hot water to the hot water chamber, an expansion spring engaging said valve element and functioning to urge the valve element toward the thermostatic element, and a relief spring housed within said valve stem and engaged by the thermostatic element and of greater strength than the expansion spring for relieving excess pressure of the thermostatic element on the valve element.

2. In a thermostatically controlled water heater, a valve casing having a wall adapted for attachment to a heater to form a portion of the wall of the heating chamber thereof, said casing having interior partitions subdividing the casing into hot and cold water chambers and a mixing chamber disposed intermediate said hot and cold water chambers, said interior partitions having opposed valve ports respectively opening into said mixing chamber and communicating with the hot and cold water chambers respectively, said casing also including a mixed water chamber communicating with said mixing chamber, a reciprocatory valve stem provided with a valve element located intermediate its ends and within said mixing chamber for movement between said opposed valve ports, a thermostatic element within said mixed water chamber and controlling said valve element to progressively open the port to the hot water chamber and to close the port to the cold water chamber when the valve element is moved in one direction and to progressively open the port to the cold water chamber and to close the port to the hot water chamber when the valve element is moved in the opposite direction, heater tubes affixed to the inner face of said wall and communicating with the hot and cold water chambers for diverting cold water from the cold water chamber and conducting the same through said heater for delivering hot water to the hot water chamber, an expansion spring for urging the valve element towards the thermostatic element, the opposite end of said valve stem having a bore extending inwardly from the free outer end thereof and provided with a shoulder at its outer end, a bearing disk, slidably mounted within said bore against which the thermostatic element is adapted to engage and a relief spring interposed between the inner end of the bore and the bearing disk, said relief spring being tensioned to maintain said disk against said shoulder and being of greater strength than said expansion spring for relieving excess pressure of the thermostatic element on the valve element.

3. In a thermostatically controlled water heater, a valve casing having interior partitions subdividing the casing into hot and cold water chambers and a mixing chamber disposed intermediate said hot and cold water chambers, said interior partitions having opposed valve ports respectively opening into said mixing chamber and communicating with the hot and cold water chambers respectively, said casing also including a mixed water chamber communicating with said mixing chamber, a reciprocatory valve stem provided with a valve element located intermediate its ends and within said mixing chamber for movement between said opposed valve ports, a thermostatic element within said mixed water chamber and controlling said valve element to progressively open the port to the hot water chamber and to close the port to the cold water chamber when the valve element is moved in one direction and to progressively open the port to the cold water chamber and to close the port to the hot water chamber when the valve element is moved in the opposite direction, an expansion spring for urging the valve element towards the thermostatic element, the opposite end of said valve stem having a bore extending inwardly from the free outer end thereof and provided with a shoulder at its outer end, a bearing disk slidably mounted within said bore against which the thermostatic element is adapted to engage and a relief spring interposed between the inner end of the bore and the bearing disk, said relief spring being tensioned to maintain said disk against said shoulder and being of greater strength than said expansion spring for relieving excess pressure of the thermostatic element on the valve element.

4. In a thermostatically controlled water heater, a valve casing having interior partitions subdividing the casing into hot and cold water chambers, and a mixing chamber disposed intermediate said hot and cold water chambers, said interior partitions having opposed valve ports respectively opening into said mixing chamber and communicating with the hot and cold water chambers respectively, said casing also including a mixed water chamber communicating with said mixing chamber, a reciprocatory valve element including a valve disk located within said mixing chamber to move therein between said opposed valve ports and having a valve stem guidedly mounted in the adjacent wall of the mixed water chamber and protruding into said chamber, a thermostatic element mounted within said mixed water chamber and controlling said valve element to progressively open the port to the hot water chamber and to close the port to the cold water chamber when the valve element is moved in one direction and to progressively open the port to the cold water chamber and close the port to the hot water chamber when the valve element is moved in the opposite direction, an expansion spring engaging said valve element and functioning to urge the valve element towards the thermostatic element, and a relief spring housed within said valve stem under tension and engaged by the thermostatic element and of normally greater strength than the expansion spring for relieving excess pressure of the thermostatic element on the valve element.

5. In a thermostatically controlled water heating device, a valve casing having a wall adapted for attachment to a heater to form a portion of the wall of the heating chamber thereof and including a pair of laterally spaced water chambers each having a water leg extending therefrom towards the other chamber and arranged in superposed spaced relation to define therebetween a mixing chamber with vertically aligned passages in said water legs communicating with the mixing chamber and having opposed valve seats, said valve casing including an upstanding thermostat chamber communicating with the mixing chamber and having a hot water outlet, a double faced valve within said mixing chamber normally urged towards the upper valve seat and a thermostat within said thermostat chamber controlled by the heat of the water supplied thereto from the mixing chamber for urging the valve towards the lower valve seat, means communicating with one of the chambers for supplying cold water thereto and pipes extending through the heating chamber and establishing communication between said water chambers for supplying hot and cold water to the mixing chamber through said water legs in accordance with the temperature setting of the thermostat.

HENRY F. YULA.